Figure 1:
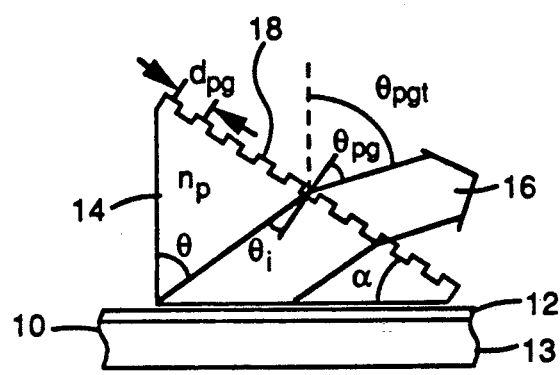

United States Patent [19]

Spaulding et al.

[11] Patent Number: 5,101,458
[45] Date of Patent: Mar. 31, 1992

[54] ACHROMATIC INPUT/OUTPUT COUPLER FOR INTEGRATED OPTICAL CIRCUITS

[75] Inventors: Kevin Spaulding, Spencerport; G. Michael Morris, Fairport, both of N.Y.

[73] Assignee: The University of Rochester, Rochester, N.Y.

[21] Appl. No.: 610,630

[22] Filed: Nov. 8, 1990

[51] Int. Cl.$^5$ ............................................. G02B 6/34
[52] U.S. Cl. .................................... 385/36; 385/37
[58] Field of Search ............... 350/96.19, 96.15, 96.12, 350/96.11, 286, 162.11-162.24

[56] References Cited

U.S. PATENT DOCUMENTS

| | | | |
|---|---|---|---|
| 3,883,221 | 5/1975 | Rigrod | 350/96.19 |
| 4,338,012 | 7/1982 | Matsumura et al. | 354/200 |
| 4,443,088 | 4/1984 | Ohtaka | 354/200 |
| 4,801,184 | 1/1989 | Revelli | 350/96.14 |
| 4,838,645 | 6/1989 | Mächler et al. | 350/162.23 |

OTHER PUBLICATIONS

Optical Integrated Circuits, H. Nishihara, M. Haruna, T. Suhara, McGraw-Hill Book Co., (1989), especially Chapter 8 thereof.
R. Ulrich, R. J. Martin, "Geometrical Optics & Thin Film Light Guides", Applied Optics, vol. 10, No. 9, Sep. 1971, p. 2077.
J. P. Boyd, C. S. Kuo, "Composite-Prism-Grating Coupler for Coupling Light Into High Refractive Index Thin Film Waveguides", Applied Optics, vol. 15, #7, Jul. 1976, p. 1681.

Primary Examiner—Frank Gonzalez
Attorney, Agent, or Firm—Martin Lukacher

[57] ABSTRACT

In order to stabilize the coupling angle, at which light is coupled into and out of an optical waveguide of an integrated optical circuit or the like, with changes in wavelength of the light (to achromatize the coupling angle characteristics of the waveguide input/output coupler) a hybrid prism/grating coupler is used. The grating produces achromatic coupling over a range which can be as large as 200 nanometers (nm) for typical waveguide materials by compensating for the dispersion due to the change in the effective mode index of the waveguide and the prism with variations in wavelength.

10 Claims, 4 Drawing Sheets

ACHROMATIC INPUT/OUTPUT COUPLER FOR INTEGRATED OPTICAL CIRCUITS

DESCRIPTION

The present invention relates to input/output couplers for optical integrated circuits, and particularly to achromatic couplers which couple light into and out of optical waveguides such as used in optical integrated circuits.

The invention is especially suitable for providing an achromatic hybrid prism/grating coupler which, when associated with an optical waveguide, achromatizes the coupling angle characteristics of the coupler.

The wavelength dependence of the coupling angle has militated against the use of integrated optical circuits, since it is necessary to couple light at essentially the same angle into and/or out of the waveguides of these circuits, for example, to external nonintegrated components such as fiber optics, bulk optics, sensors or light sources, which are in fixed geometric relationship with the integrated optical circuits. Typically laser diode light sources are used for many integrated optics applications. At present, readily available diodes may operate in a multimode state and provide light which may fluctuate over a wavelength range of a few nanometers. Individual diodes also have different nominal wavelengths which may vary over a wavelength range of tens of nanometers.

At the present time, prism couplers and grating couplers have been suggested for use as waveguide input/output couplers. See the text, Optical Integrated Circuits by H. Nishihara, M. Haruna and T. Suhara, McGraw-Hill Book Company (1989) and especially Chapter 8 thereof. Such couplers are highly wavelength dependent because the effective mode index of the waveguide, N, is a strong function of wavelength and because of diffractive effects for the grating coupler. The mode index is sometimes written as $N(\lambda)$ and is the effective refractive index of the propagating waveguide mode. A discussion of effective mode index in optical waveguides is found in an article by R. Ulrich and R. J. Martin entitled "Geometrical Optics and Thin Film Light Guides" which appeared in Applied Optics, Volume 10, No. 9, September, 1971, page 2077. Accordingly., commercial application of integrated optical circuits has been held back by the need for wavelength constant light sources of low cost.

This invention provides couplers with achromatic coupling angle properties over a wide wavelength range so as to enable laser diodes, which are generally available at low cost, as well as other broadband or tunable light sources to be used. It has been found in accordance with the invention that a coupler wherein a grating achromatizes the coupling angle of a prism coupler provides the freedom of design necessary to obtain achromatic ranges which are an order of magnitude larger than with prism couplers or grating couplers and even with double grating couplers such as suggested in an article by T. Suhara and H. Nishihara entitled "Integrated-Optic Disc Pick Up Devices Using Waveguide Holographic Components" which appeared in SPIE Volume 1136, Holographic Optics II: Principles and Applications (1989), page 92 (see especially page 97 last paragraph). For a coupling angle tolerance of 0.005° it has been found that with hybrid prism/grating couplers in accordance with the invention, an achromatic wavelength range can be as large as 200 nanometers, while with double grating couplers the achromatic wavelength range is on the order of 10 nanometers in wavelength. It is believed that this range increase is attributable to the dependence of the coupling angle on the index dispersion of the prism. Accordingly by the choice of prism material parameters, the wavelength range can be increased. The hybrid prism/grating coupler allows the coupling angle to be varied simply by changing the prism angle thereby obtaining the coupling angle which is desired for the particular application.

Accordingly, it is the principal object of the present invention to provide improved waveguide input/output couplers for achromatization of integrated optical components using diffractive optics.

It is a further object of the present invention to provide an improved waveguide input/output coupler having a much larger achromatic wavelength range than couplers which have heretofore been suggested.

It is a still further object of the present invention to provide an improved waveguide input/output coupler utilizing a prism and a diffractive element wherein the prism material may be selected to provide freedom of design of the achromatic parameters of the coupler.

It is a still further object of the present invention to provide an improved method of achromatizing the coupling angle for light being coupled into and out of optical waveguides.

Briefly described, an integrated optical circuit having an optical waveguide is provided, in accordance with the invention, with an input/output coupler having a prism for coupling light into or out of the waveguide, which is achromatized by a diffractive element, which defines with the prism a condition for achromatic coupling where angular dispersion of the light is eliminated with variations in wavelength of the light over a range of interest sufficient to cover wavelength variations due to mode hopping and like in laser diodes and replacement of laser diodes in the circuit and also allows the use of broadband and even tunable light sources.

Figure 2:
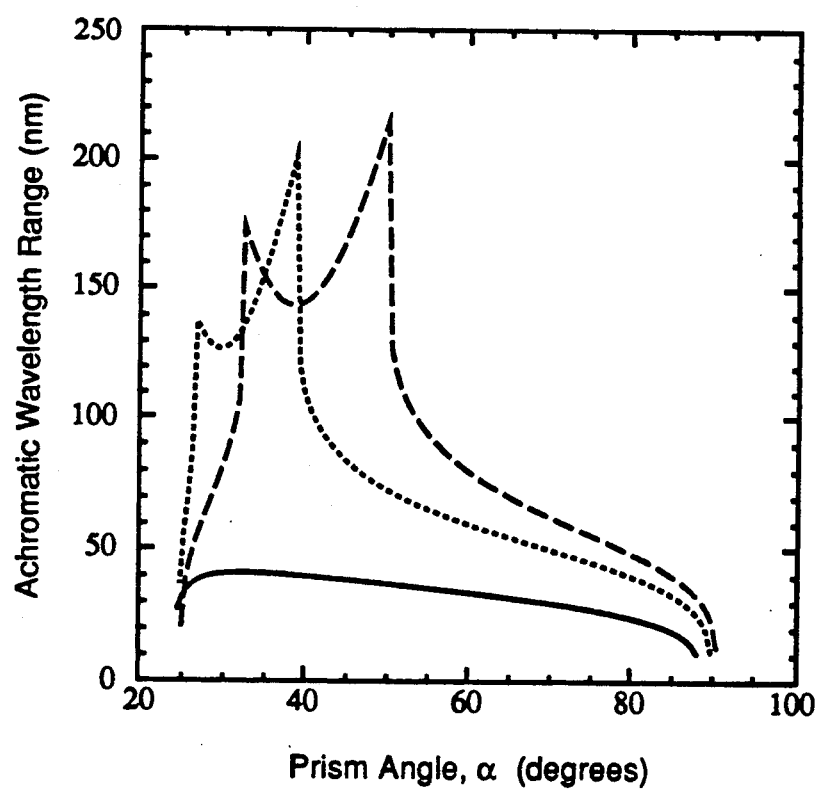
Figure 3:
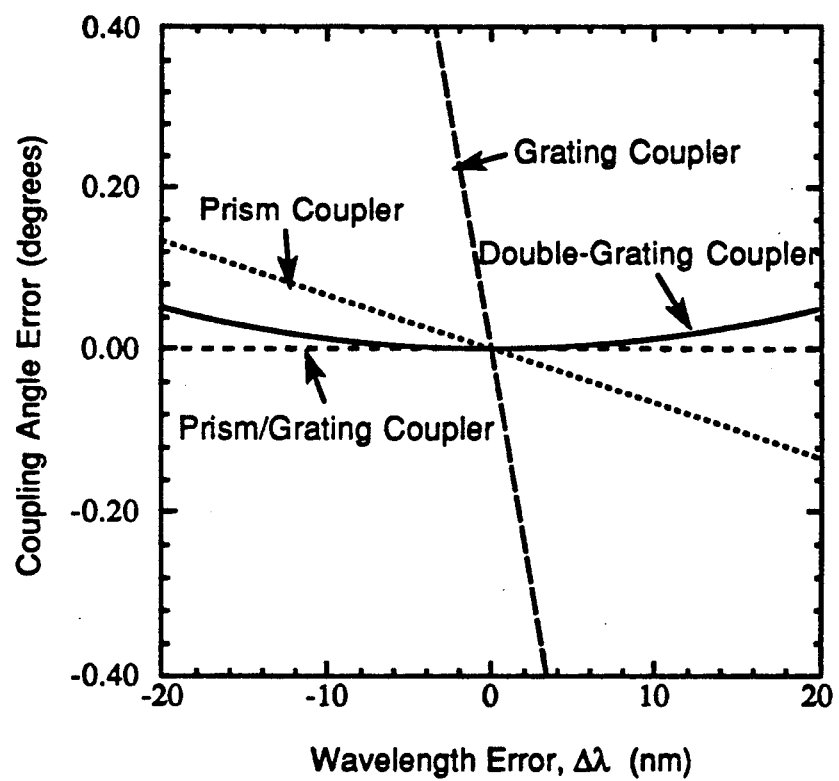
Figure 4:
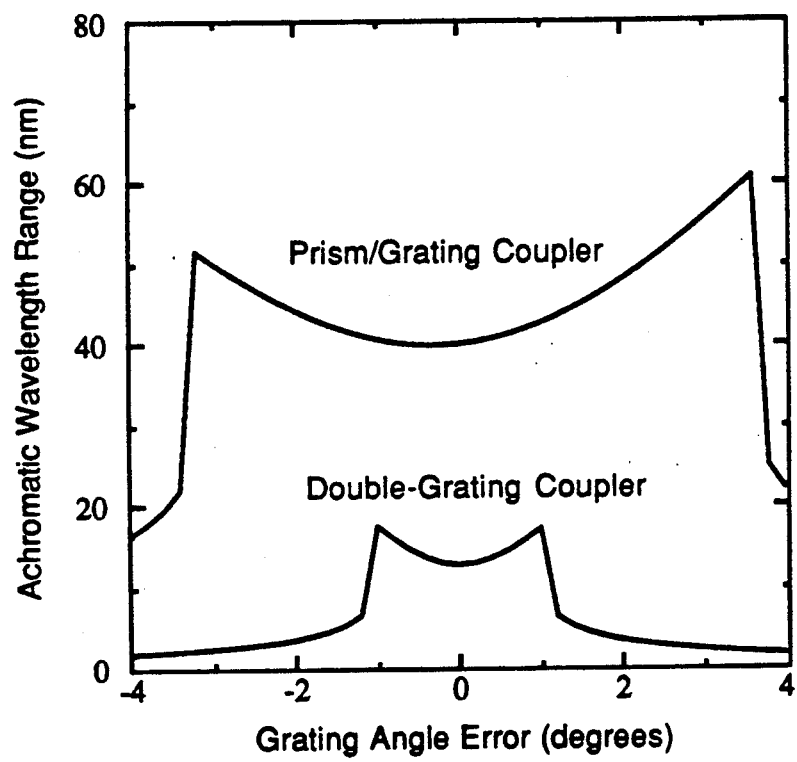

The foregoing and other objects, features and advantages of the invention, as well as a presently preferred embodiment thereof will become more apparent from a reading of the following description in connection with the accompanying drawings in which:

FIG. 1 is a schematic diagram of a hybrid prism/grating coupler embodying the invention;

FIG. 2 is a plot showing the achromatic wavelength range of a hybrid prism/grating achromatic coupler of the design shown in FIG. 1 as a function of prism angle ($\alpha$ in FIG. 1) for three different prism materials: SF6 (solid curve), LaSF3 (dotted curve), and LaSFN30 (dashed curve) with a waveguide provided by a 0.6 micrometer (um) layer of Corning #7059 Glass on an oxidized silicon substrate at a design wavelength of 632.8 nm, and for an angular tolerance of 0.005°;

FIG. 3 is a plot showing the comparison of coupling angle shifts caused by wavelength changes for conventional prism and grating couplers, double grating couplers and achromatic prism/grating couplers of the design shown in FIG. 1; the waveguide for the plot being, for example, taken to be a layer of 0.6 um Corning #7059 glass on an oxidized silicon substrate with a prism in the hybrid prism/grating coupler made of LaSF3 with a prism angle of 38°, the nominal coupling angle for the grating couplers being 20° and the grating angle for the double grating coupler being 63°; and FIG. 4 is a plot showing the achromatic wavelength range of prism/grating and double grating couplers as a function of errors in the compensating grating angle with the waveguide prism and angles being as described for the preceding Figures.

Referring to FIG. 1, there is shown a cross section through an optical waveguide which may be part of an integrated circuit. This waveguide is rectangular in a plane perpendicular to the plane of the drawing and has a first layer 12 and a substrate layer 13. The light propagates within the first layer 12 which is higher in refractive index than the substrate layer 13. A clading layer (not shown) may be disposed on top of the high index layer 12. A prism 14, shown as a right prism, has a side perpendicular to the waveguide 10. It is not a necessary constraint that the prism be a right prism, nor need a side be perpendicular to the waveguide. The base surface and the hypotenuse surface of the prism 14 define the prism angle $\alpha$. The base surface is spaced adjacent and parallel to the waveguide 10. The base surface is on top of the high index layer 12 where the light, shown as a beam 16, is to be coupled. Coupling is shown out of the waveguide; it being appreciated that light may be coupled into the waveguide in the direction opposite to that of the arrowhead at the end of the beam 16. $\theta$ is the coupling angle within the prism 14 and is to a perpendicular to the surface of the waveguide 10. A diffractive element 18, is provided on the hypotenuse surface of the prism. This element 18 is preferably in the hypotenuse surface and is preferably a blazed grating formed by photolithographic techniques. Alternatively, the grating may be a volume grating formed by a holographic process or similar processes conventionally used to make volume gratings. It will be noted that the grating is on the outside of the coupler, rather than on the inside of the coupler (i.e., the grating is not in the base surface of the prism or in the waveguide layer 12). Such a composite prism grating coupler is shown in an article by J. P. Boyd and C. S. Kuo entitled "Composite Prism—Grating Coupler For Coupling Light Into High Refractive Index Thin Film Waveguides" appearing in Applied Optics Volume 15, Number 7, July 1976, page 1681. In the Boyd and Kuo coupler, the prism is used only for beam steering, not for wavelength shift compensation. The refractive index dispersion of prisms of known materials is not high enough to compensate for the dispersion in the waveguide and grating.

The output coupling angle of the light 16 is shown as $\theta_{pgt}$. The incident and diffraction angles with respect to the grating are $\theta_i$ and $\theta_{pg}$, respectively. The grating line spacing or periodicity is $d_{pg}$. The index of the prism material is $n_p$.

Considering the prism 14 alone, the condition that determines the angle at which coupling will occur for the prism coupler is given by $$N(\lambda)k = n_p(\lambda)k \sin\theta. \tag{1}$$

where $\lambda$ is the wavelength in vacuum, k is equal to $2\pi/\lambda$, $n_p(\lambda)$ is the refractive index of the prism, $N(\lambda)$ is the effective mode index of the waveguide and $\theta$ is the coupling angle in the prism. Likewise, the coupling condition for a grating coupler is $$kN(\lambda) - \frac{2\pi}{d_{gl}} m_{gl} = k\sin\theta, \tag{2}$$

where $d_{gl}$ and $m_{gl}$ are the grating, spacing and diffraction order, respectively, for the grating.

In the hybrid prism/grating coupler shown in FIG. 1, the grating 18 is used to correct the dispersion of the prism coupler (the dispersion of the waveguide 10 and also the prism 14). As noted above, it may be convenient to apply the grating right onto the output surface (hypotenuse 18) of the prism 14 as shown in FIG. 1. While this is not a necessary constraint, it makes for a very compact, stable package. The coupling condition that determines the beam angle within the prism is give in Eq. (1). The dispersion of the beam within the prism can be characterized by differentiating this equation with respect to wavelength and solving for the derivative of the coupling angle:

$$\frac{d\theta}{d\lambda} = \frac{n_p \frac{dN}{d\lambda} - N \frac{dn_p}{d\lambda}}{n_p^2 \cos\theta}. \tag{3}$$

The compensating grating will deflect the beam by the well-known grating equation:

$$m_{pg}\lambda = d_{pg}(\sin\theta_{pg} - n_p \sin\theta_i). \tag{4}$$

where $d_{pg}$ and $m_{pg}$ are the grating spacing and diffraction order, respectively, and the angles $\theta_i$ and $\theta_{pg}$ are defined in FIG. 1. Differentiating Eq. (4) with respect to wavelength we find that $$m_{pg} = d_{pg}\left(\cos\theta_{pg}\frac{d\theta_{pg}}{d\lambda} - n_p\cos\theta_i\frac{d\theta_i}{d\lambda} - \frac{dn_p}{d\lambda}\sin\theta_i\right). \tag{5}$$

Since the final coupling angle, $\theta_{pg}$ is desired to be a constant over some interval around the design wavelength, this leads us to define the achromatic coupling condition to be that the derivative of the final output angle with respect to wavelength equals zero. For this case, $d\theta_{pg}/d\lambda$ equals zero. Making this substitution in Eq. (5) it can be seen that the achromatic coupling condition is met when $$\frac{d\theta_i}{d\lambda} = \frac{-1}{n_p\cos\theta_i}\left(\frac{m_{pg}}{d_{pg}} + \frac{dn_p}{d\lambda}\sin\theta_i\right). \tag{6}$$

Now, using geometry, it is seen from FIG. 1 that $$\theta_i = \theta - \alpha. \tag{7}$$

where $\alpha$ is the prism angle. And since $\alpha$ is a constant it follows that $$\frac{d\theta_i}{d\lambda} = \frac{d\theta}{d\lambda}. \tag{8}$$

Substituting from Eqs. (3) and (6) in Eq. (8), and solving for $d_{pg}$, results in an expression for the grating period that achromatizes the prism coupler:

$$d_{pg} = \frac{-m_{pg}\cos\theta}{\cos\theta_i\left(\frac{dN}{d\lambda} - \frac{N}{n_p}\frac{dn_p}{d\lambda}\right) + \sin\theta_i\cos\theta\frac{dn_p}{d\lambda}} \tag{9}$$

As seen from Eqs. (1) and (7), the angles $\theta$ and $\theta_i$ are functions of the physical waveguide and prism constants; hence the grating frequency that gives achromatic coupling can be calculated for any specified waveguide/prism combination.

The hybrid prism/grating achromatic coupler having a prism angle, $\alpha$, and a corresponding grating period given by Eq. (9), will have a final coupling angle that will be essentially a constant over some interval around the design wavelength. Since the prism angle is a free variable, there will be a series of prism angle/grating frequency pairs will result in achromatic coupling for a given waveguide/prism material combination. Since the total coupling angle, $\theta_{pgt}$ will be a function of the prism angle, it can be controlled over a fairly wide range by choosing the appropriate value of this parameter.

To examine achromatic range questions, consider the Taylor series expansion of the coupling angle around the design wavelength, $\lambda_0$:

$$\theta_{pg}(\lambda) = \theta_{pg}(\lambda_o) + \frac{d\theta_{pg}(\lambda_o)}{d\lambda}(\lambda - \lambda_o) + \frac{d^2\theta_{pg}(\lambda_o)}{d\lambda^2}\frac{(\lambda - \lambda^2)}{2!} + O[(\lambda - \lambda_o)^3]. \quad (10)$$

If the grating spacing is chosen to meet the achromatic coupling condition, the first order term on the right hand side of Eq. (10) will equal zero. Keeping the next term in the series expansion, the coupling angle is approximately given by $$\theta_{pg}(\lambda) = \theta_{pg}(\lambda_o) + \frac{d^2\theta_{pg}(\lambda_o)}{d\lambda^2}\frac{(\lambda - \lambda_o)^2}{2}. \quad (11)$$

The coupling angle error, $\Delta\theta_{pg}$, can likewise be approximated by $$\Delta\theta_{pg} = \theta_{pg}(\lambda) - \theta_{pg}(\lambda_o) = \frac{d^2\theta_{pg}(\lambda_o)}{d\lambda^2}\frac{(\lambda - \lambda_o)^2}{2}. \quad (12)$$

The achromatic wavelength range $R_\lambda$, is defined to be the range of wavelengths where the coupling angle error is less than a given tolerance, $\Delta\theta_{tol}$. In the cases where the approximation for the coupling angle error given in Eq. (12) is valid, then an approximation for the achromatic wavelength range is found by solving Eq. (12) for $(\lambda-\lambda_0)$, and doubling the result since the angular error in Eq. (12) is symmetric:

$$R_\lambda = 2(\lambda - \lambda_o) = 2\sqrt{\frac{2\Delta\theta_{tol}}{\left|\frac{d^2\theta_{pg}(\lambda_o)}{d\lambda^2}\right|}}. \quad (13)$$

It is seen that as long as the higher order terms in the Taylor series are small relative to the quadratic term, so that Eq. (11) is a valid approximation, the achromatic wavelength range will be inversely proportional to the square root of the second derivative of the final coupling angle, $\theta_{pg}$. Therefore, to maximize the achromatic range magnitude of the second derivative of $\theta_{pg}$ can be minimized. However, the approximation given in Eq. (13) will not be valid in the limit where the second derivative actually goes to zero because the higher order terms in the power series expansion that we have dropped will then become the terms which are responsible for the majority of the coupling angle error. In that case, the approximate achromatic range calculated from Eq. (13) would go to infinity, but the actual achromatic range will be constrained by the other non-zero terms that we have neglected. In examples where the second derivative is small, or actually goes to zero, minimizing the magnitude of the second derivative will not necessarily maximize the achromatic wavelength range, however, it should still result in a large range since the higher order terms will in general be small. In such cases, an iterative incremental search could be necessary to determine the true global maximum.

Taking the derivative of Eq. (5), and using the fact that if the grating frequency is chosen using Eq. (9) then $d\theta_{pg}/d\lambda$ will be zero, we find an expression for the second derivative of the final coupling angle:

$$\frac{d^2\theta_{pg}}{d\lambda^2} = \frac{\cos\theta_i}{\cos\theta_{pg}}\left[n_p\frac{d^2\theta_i}{d\lambda^2} + 2\frac{d\theta_i}{d\lambda}\frac{dn_p}{d\lambda}\right] + \frac{\sin\theta_i}{\cos\theta_{pg}}\left[\frac{d^2n_p}{d\lambda^2} - n_p\left(\frac{d\theta_i}{d\lambda}\right)^2\right]. \quad (14)$$

Note that from Eqs. (3) and (8):

$$\frac{d\theta_i}{d\lambda} = \frac{n_p\frac{dN}{d\lambda} - N\frac{dn_p}{d\lambda}}{n_p^2\cos\theta}, \quad (15)$$

and differentiating Eq. (15) with respect to $\lambda$ and using Eq. (3):

$$\frac{d^2\theta_i}{d\lambda^2} = \frac{1}{n_p^4\cos^3\theta}\left\{\cos^2\theta\left[n_p^3\frac{d^2N}{d\lambda^2} - n_p^2N\frac{d^2n_p}{d\lambda^2} - 2n_p^2\frac{dN}{d\lambda}\frac{dn_p}{d\lambda} + 2Nn_p\left(\frac{dn_p}{d\lambda}\right)^2\right] + \sin\theta\left[n_p^2\left(\frac{dN}{d\lambda}\right)^2 - 2Nn_p\frac{dN}{d\lambda}\frac{dn_p}{d\lambda} + N^2\left(\frac{dn_p}{d\lambda}\right)^2\right]\right\}. \quad (16)$$

The quantities in Eqs. (15) and (16) are all functions of the material parameters. For a given waveguide/prism material combination the value of these expressions can be determined independent of prism angle and grating frequency. They will, however, vary with design wavelength since most of the material parameters are wavelength dependent. The dispersion characteristics of the prism are particularly important. The magnitude of Eq. (14), and therefore the magnitude of the achromatic range, will be affected very significantly by the magnitude of the first and second derivatives of the prism index. The choice of the prism material can consequently have a large effect on the performance of the prism/grating coupler.

The influence that the choice of prism material can have upon the size of the achromatic wavelength range can be seen in FIG. 2. This plot shows the actual achromatic range as a function of prism angle for three different prism materials that have essentially the same nominal index of refraction, but substantially different dispersion characteristics. It can be seen that whereas an achromatic wavelength range of about 40 nm is possible for a prism made of SF6, achromatic ranges of approximately 200 nm are possible for the other two prism materials.

To illustrate the improvement in the dispersion characteristics of achromatic waveguide couplers provided by the invention, consider a Corning #7059 waveguide on an oxidized silicon substrate. FIG. 3 shows the results of a computer simulation that calculated the actual coupling angles for TE0 modes over a ±20 nm wavelength range around the design wavelength for the various coupling schemes. The prism material used in this simulation was LaSF3. The dispersion characteristics of the waveguide and prism materials were calculated using index dispersion relationships given by the material manufacturers. The conventional prism and grating couplers used in this comparison are identical to the achromatic configurations with the compensating gratings removed.

The hybrid prism/grating coupler of FIG. 1 is corrected over a much larger wavelength range than the double-grating coupler. To see the benefits of an achromatic coupler, consider a typical application. An optical disk pickup head, like the designs proposed by Suhara et al in the SPIE article referenced above may have a spot positional tolerance of approximately 0.2 um. If the beam that is coupled out of the wavelength is focused with an objective lens with a focal length of 2 mm, the maximum angular deviation of the coupling angle that could be tolerated is 0.005°. For the conventional grating coupler (or a focusing grating coupler) this would limit the wavelength range to approximately 0.085 nm, which is less than a single mode hop of a typical laser diode. For the conventional prism coupler the acceptable wavelength range would be 1.5 nm, which is somewhat larger. For the double-grating configuration the range is about 13 nm. The hybrid prism/grating coupler achromatic range is 190 nm which allows for wavelength variations in laser diode and among different laser diodes (as when a diode must be replaced), and permits use of other broadband or tunable sources.

The numerically determined achromatic wavelength range as a function of the error in the grating (or prism) angle is shown in FIG. 4 again showing the vastly improved results obtained from the hybrid prism/grating coupler of this invention.

From the foregoing description it will be apparent that there has been provided improved methods of achromatizing integrated optical circuit elements and particularly the waveguide couplers thereof as well as improved waveguide couplers using diffractive and refractive elements (the hybrid prism/grating coupler). Variations and modifications in the herein described method and apparatus, within the scope of the invention, will undoubtedly suggest themselves to those skilled in the art. Accordingly, the foregoing description should be taken as illustrative and not in a limiting sense.

We claim:

1. In an integrated optical circuit having an optical waveguide and a prism in sufficiently close proximity to said waveguide for coupling light into or out of said waveguide at a coupling angle (between the light and a normal to the waveguide), the improvement comprising a diffractive element through which the light is transmitted into and out of said waveguide via said prism which defines with said prism a condition for achromatic coupling where the coupling angle remains constant with variations in wavelength.

2. In an integrated optical circuit having an optical waveguide and a prism for coupling light into or out of said waveguide at a coupling angle (between the light and a normal to the waveguide), the improvement comprising a diffractive element which defines with said prism a condition for achromatic coupling where the coupling angle remains constant with variations in wavelength, said prism having a first surface disposed adjacent to said waveguide and a second surface which makes a prism angle with said first surface, said diffractive element being disposed along said second surface.

3. The improvement according to claim 2 wherein said diffractive element is a grating having lines in said second surface of said prism.

4. The improvement according to claim 3 wherein said diffraction grating has a periodicity, $d_{pg}$ defined by the following equation:

$$d_{pg} = \frac{-m_{pg}\cos\theta}{\cos\theta_i \left(\frac{dN}{d\lambda} - \frac{N}{n_p}\frac{dn_p}{d\lambda}\right) + \sin\theta_i \cos\theta \frac{dn_p}{d\lambda}}.$$

where $m_{pg}$ is the order of the diffraction of light, $\theta$ is the coupling angle (between the light and a normal to the waveguide), $\theta_i$ is $\theta$ minus the prism angle ($\alpha$) and is the angle of the light to said second surface, N, is the effective mode index of the waveguide, $\lambda$ is the wavelength of the light and $n_p$ is the refractive index of the prism.

5. The improvement according to claim 4 herein the prism material is selected to maximize the wavelength range R with respect to a designed wavelength $\lambda_0$ where the coupling angle $\theta_{pg}$ which the light makes with a normal to said second surface is within a given tolerance angle $\Delta\theta_{tol}$.

6. The improvement according to claim 5 wherein said range is approximately defined by the following equation:

$$R_\lambda = 2(\lambda - \lambda_o) = 2\sqrt{\frac{2\Delta\theta_{tol}}{\left|\frac{d^2\theta_{pg}(\lambda_o)}{d\lambda^2}\right|}}.$$

7. The improvement according to claim 6 wherein the diffraction angle of the light from said element is the angle of the light leaving the prism and grating and provides the coupling angle.

8. The method of achromatizing the coupling angle for light into and out of an optical waveguide along which light propagates which comprises the steps of coupling the light into and out of said waveguide via a prism having a first surface adjacent said waveguide and a second surface through both of which surfaces said light passes, and transmitting said light into and out of said prism via a diffraction grating adjacent to or forming said second surface, said grating having a periodicity which maintains the coupling angle generally constant over a range of wavelength of said light about a design wavelength $\lambda_0$.

9. The method according to claim 8 wherein said grating is selected to have a periodicity $d_{pg}$ for a given prism angle $\alpha$ between first and second surfaces of said prism respectively in the direction of propagation of light along said waveguide and at the angle α to said first surface as defined by the following equation.

$$d_{pg} = \frac{-m_{pg}\cos\theta}{\cos\theta_i\left(\frac{dN}{d\lambda} - \frac{N}{n_p}\frac{dn_p}{d\lambda}\right) + \sin\theta_i\cos\theta\frac{dn_p}{d\lambda}}.$$

where $m_{pg}$ is the order of the diffraction of the light, ... $\theta$ is the coupling angle (between the light and a normal of the waveguide), $\theta_i$ is $\theta$ minus the prism angle (α) and is the angle of the light to said second surface, ... N, is the effective mode index of the waveguide, λ is the wavelength of the light and $n_p$ is the refractive index of the prism.

10. The method according to claim 9 which comprises selecting materials from said prism to maximized said range.

* * * * *